F. E. WHITE.
HANDLE ATTACHING MEANS.
APPLICATION FILED DEC. 11, 1914.
1,180,354.
Patented Apr. 25, 1916.
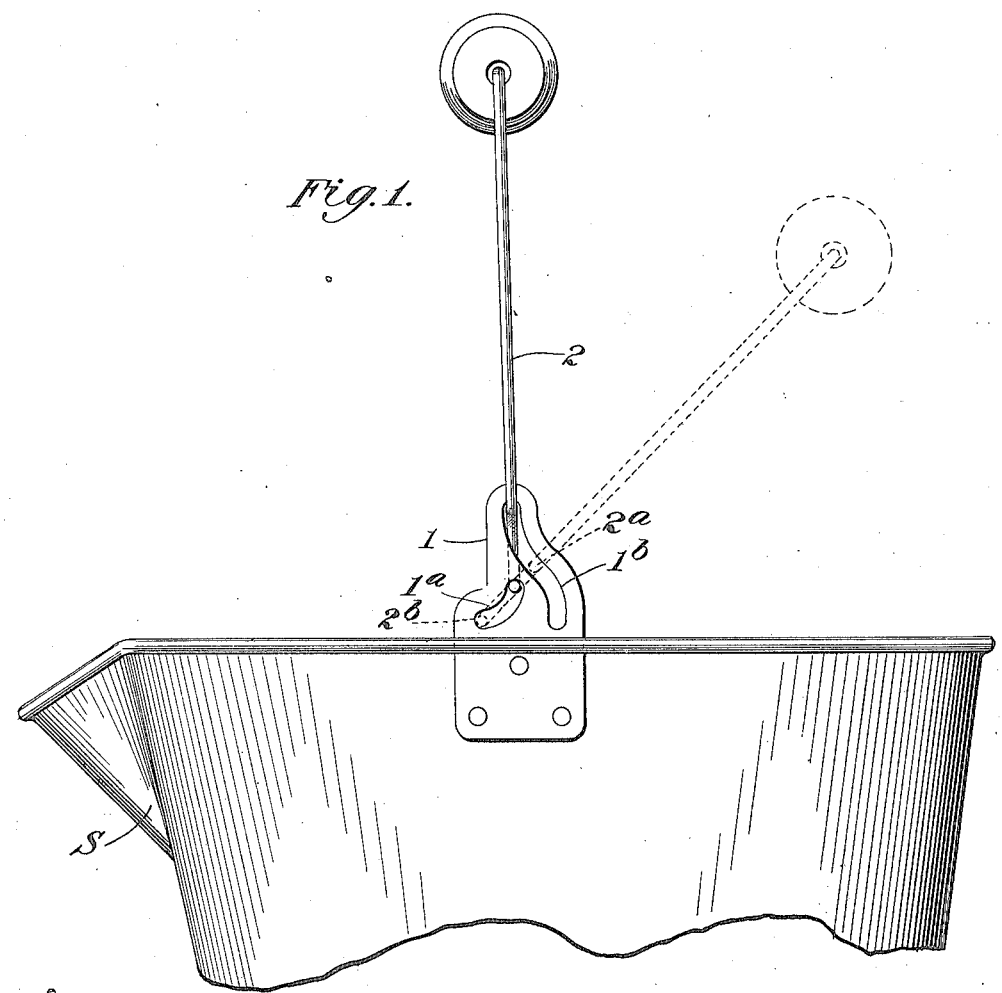
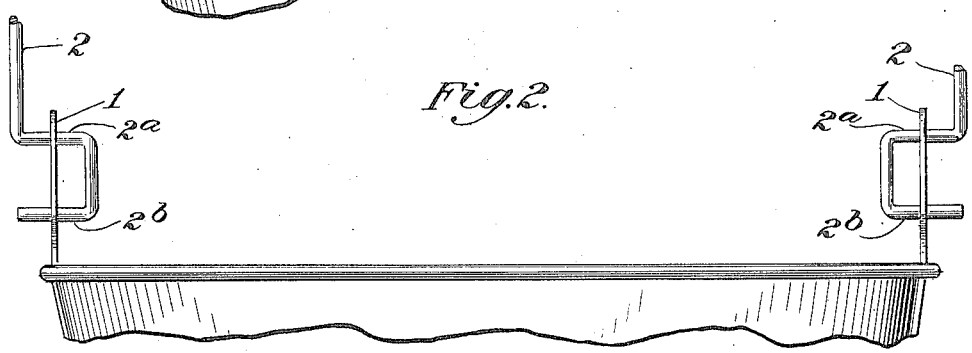
Attest:
E. W. Hamilton.
C. E. Parsons
Inventor
Fred E. White.
by Shear Middleton Donaldson Shear
Attys.

UNITED STATES PATENT OFFICE.

FRED E. WHITE, OF GARDNER, MASSACHUSETTS, ASSIGNOR TO CENTRAL OIL & GAS STOVE COMPANY, OF GARDNER, MASSACHUSETTS, A CORPORATION OF MASSACHUSETTS.

HANDLE-ATTACHING MEANS.

1,180,354.     Specification of Letters Patent.     Patented Apr. 25, 1916.

Application filed December 11, 1914. Serial No. 876,703.

*To all whom it may concern:*

Be it known that I, FRED E. WHITE, a citizen of the United States, residing at Gardner, Massachusetts, have invented certain new and useful Improvements in Handle-Attaching Means, of which the following is a specification.

The present invention relates to improved means of attaching swinging handles or bails, such as are adapted to be applied to buckets, tea kettles, oil cans or the like.

The object of the present invention is to provide attaching means for the swinging handle of a utensil, which will automatically lock the handle in its raised position, when the utensil is being lifted or carried thereby, and which will allow the handle to fall down in one direction, permanently toward the back of the utensil to which it is attached.

With this and other objects in view, the invention consists in the construction and arrangement of parts more fully set forth in the following specification, illustrated in the accompanying drawings, and pointed out in the appended claims.

In the drawings: Figure 1 is a side elevation of a bucket provided with the present form of handle attaching means. Fig. 2 is a front elevation of same.

Referring now to the drawings, the handle attaching means consists of a pair of upstanding metal plates 1, which are permanently secured at opposite sides of the utensil. These plates may be cemented to the top of the vessel or they may be formed integrally therewith as in the case where they are used in applying a handle to a small bucket. In the drawing the invention is shown by way of example as applied to a milking bucket provided with a lip or spout S, at its forward part. The plates 1 are exact duplicates and are adapted to be engaged by the opposite ends of a swinging wire handle or bail 2. Each plate 1 is provided with two curved slots $1^a$, and $1^b$, in which the bent end of the wire bail 2 is slidably carried. By reference to the figures of the drawing it will be seen that the handle 2, which is practically a semi-circular arc, has its ends each bent into a U-shaped form. One side $2^a$ of the U-shaped part passes through the slot $1^b$ inwardly, while the other side $2^b$ of the U-shaped part passes through the other slot $1^a$ outwardly. The small curved slot $1^a$ is in the form of an arc of a circle whose center would be situated in front of and about opposite the middle of the plate 1. The other curved slot $1^b$ partakes of the nature of a compound curve having a general diagonal slant downwardly and rearwardly from the top of the plate 1 to the bottom. When the swinging handle or bail 2 is not in its raised position, two sides of the U-shaped end portions will rest at the respective lower ends of the two curved slots. The handle or bail itself will occupy a position extending around the back of the top of the utensil. When the vessel is lifted by the handle, the part $2^b$ serves as a pivot for the handle remaining temporarily at the bottom of slot $1^a$ upwardly in the slot $1^b$. When the handle has been moved upward for about 45° the parts are in the dotted line positions. Upon further upward movement of the handle the part $2^a$ continues to move into the upper part of the slot $1^b$ and the other part $2^b$ of the U-shaped end simultaneously slides into the upper end of the arc shaped slot $1^a$ until the handle is in the vertical position shown in full lines Fig. 1. With the handle in this position the parts $2^a$ and $2^b$ are in the extreme upper ends of the slots $1^b$ and $1^a$ respectively. The swinging handle or bail is thus locked against movement in either direction so long as any downward weight is exerted by the bucket or utensil. It will be seen from the drawing that the upper ends of the two slots are in substantially vertical alinement. When the utensil is set down and the weight removed from the handle ends, the handle will readily drop and the slots $1^b$ and $1^a$ will so guide the U-shaped ends that the handle can only fall backward or away from that side of the vessel in which the spout S is formed.

Having described my invention, what I claim is:—

1. The combination with a utensil having a swinging handle with U-shaped end portions, of attaching means comprising a pair of plates each having two curved slots therein with which said U-shaped end portions constantly engage, substantially as described.

2. A handle attaching means comprising a plate, having a pair of curved slots formed therein, a swinging handle or bail having a U-shaped end portion, the two sides of the U-shaped end portion adapted to slidably and constantly engage the two curved slots of said plate, substantially as described.

3. A handle attaching means comprising a plate having a pair of curved slots formed therein, one slot beginning near the top of the plate and following the line of a compound curve, the other slot being short and arranged beneath and to one side of the first slot, a swinging handle having end portions slidably and constantly engaging both slots, substantially as described.

In testimony whereof, I affix my signature in presence of two witnesses.

FRED E. WHITE.

Witnesses:
WALTER A. SLADE,
B. F. ROTHWELL.

Copies of this patent may be obtained for five cents each, by addressing the "Commissioner of Patents, Washington, D. C."